United States Patent Office 3,512,860
Patented May 19, 1970

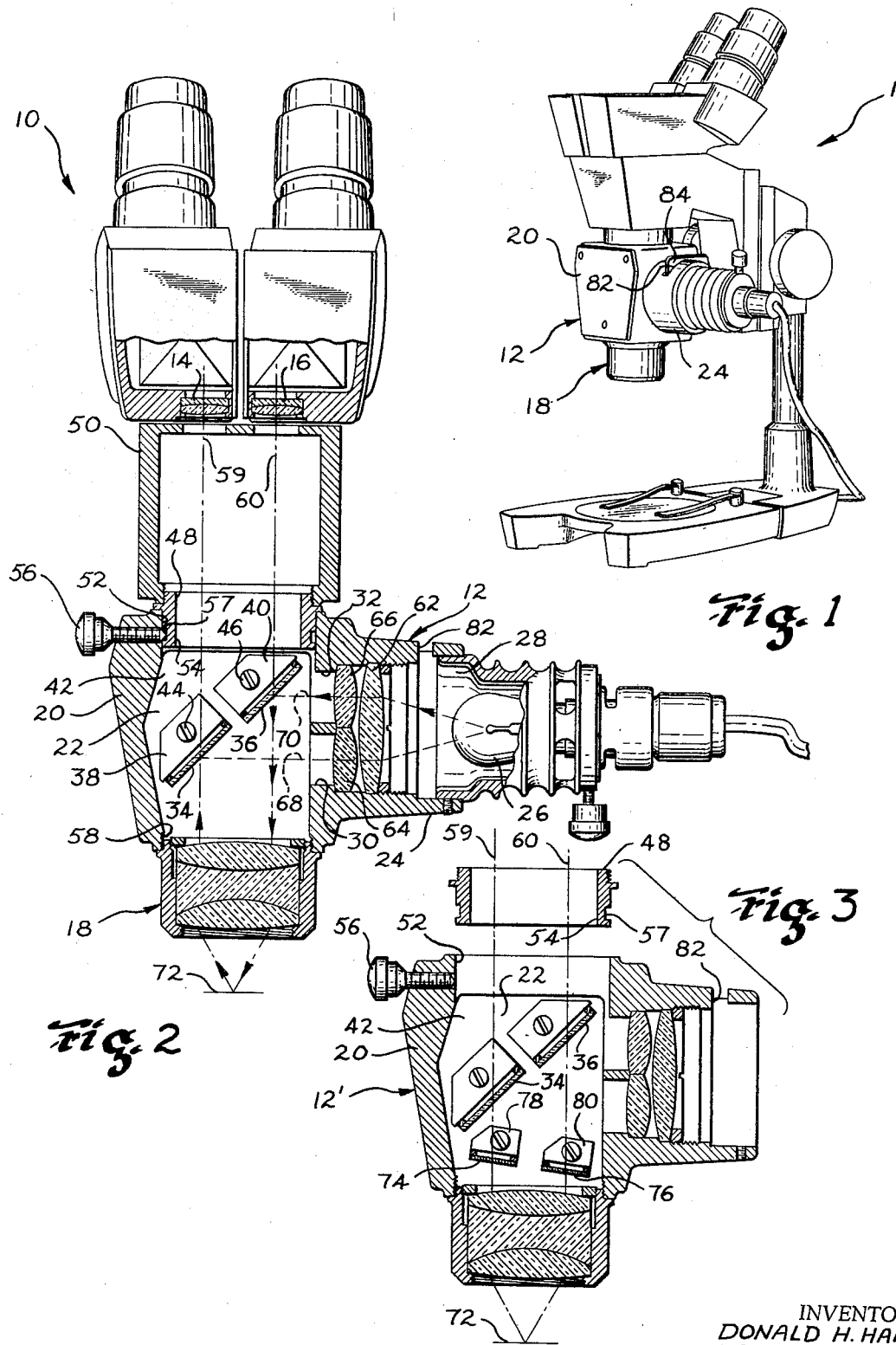

3,512,860
VERTICAL ILLUMINATOR FOR STEREOSCOPIC MICROSCOPY
Donald H. Hansen and Howard A. Maier, Williamsville, N.Y., assignors to American Optical Corporation, Southbridge, Mass., a corporation of Delaware
Filed Feb. 15, 1968, Ser. No. 705,684
Int. Cl. G02b 21/06
U.S. Cl. 350—91                                      5 Claims

ABSTRACT OF THE DISCLOSURE

An illuminator for microscopes of the type having dual optical paths arranged to produce a pair of spaced images of a specimen for stereoscopic viewing of magnified details of the specimen. The illuminator produces two beams of light which are directed independently of each other, one into each optical path of the microscope, and thence along the respective paths onto the subject specimen for microscopic vertical illumination of the specimen surface. The invention also contemplates placement of light polarizing means in each of the aforesaid optical paths for enhancing detailed inspection of the specimen surface.

BACKGROUND OF THE INVENTION

Field of the invention

This invention relates to illuminating systems for microscopes and has particular reference to means for vertically illuminating specimens in stereoscopic microscopy.

Description of the prior art

In stereoscopic microscopy wherein microscope systems are relatively complex in that dual optical paths are required for producing a pair of spaced images of a specimen under observation, surface examination of opaque or semi-opaque specimens has heretofor been inhibited by the practice of employing illuminating systems which are extraneous to the microscope optical systems and wherewith light is directed obliquely onto the specimen surface.

When so illuminated and the specimen surfaces are smooth they tend to specularly reflect a substantial portion of such light away from the microscope objective and color fidelity, definition and other factors of visual acuity of the specimen, as viewed through the microscope system, are seriously diminished if the specimen is not tilted relative to the mean axis of the microscope system to introduce greater amounts of image forming light thereinto.

Tilting the specimen, however, has the disadvantage of distorting the microscopic image of the specimen and introducing an out-of-focus condition of portions of the specimen.

As to distortion of the image, this is primarily a keystone type of distortion resulting from one end of the specimen being nearer the microscope objective than its opposite end, when speaking of specimens which have such ends. In the case of circular specimens, there is the similar result of the microscope image appearing non-circular or somewhat oval and not in true perspective.

In the matter of focus, various degrees of tilting of a specimen relative to the mean axis of the microscope system tend to cause portions of the specimen to extend above and/or below the object plane of the microscope system with the result of such portions being imaged in a somewhat out-of-focus condition.

Tilting of the specimen, accordingly, does not produce the true perspective and overall definition of image which the observer is usually desirous of obtaining in stereoscopic microscopy.

The present invention, however, overcomes the aforementioned drawbacks in stereoscopic microscopy by the provision of vertical illumination in stereoscopic microscopes wherewith enhanced color fidelity, sharp focus and other factors which are essential to high quality specimen analysis, inspection, precision in manipulation of specimens under examination and/or the performance of assembly operations under the microscope are made possible.

Summary of the invention

According to the present invention the illuminator comprises a housing containing a vertical illuminating system which includes a light source, means for producing a pair of separated beams of light emanating from the source and a beam splitter disposed in each.

The light source and means for producing the separated beams of light are contained within a lateral extension of an enlarged hollow portion of the housing. The enlarged portion of the housing is proximally, preferably detachably, connected to the main body of a stereoscopic microscope intermediate of the dual image planes and the objective of the microscope system.

In the illustrated embodiment of the invention, the aforesaid interjection of the illuminating system is accomplished by making provision for attachment of the microscope objective to the housing and the housing to the body of the microscope thereby arranging for the dual optical paths or branches of the stereoscopic microscope to pass through the enlarged hollow portion of housing.

Within the enlarged hollow portion, the aforesaid beam splitters are positioned one in each of the dual optical paths of the microscope system so as to each receive light from one of the two beams and redirect such light discretely along its respective optical path through the objective for effecting true vertical illumination of a specimen positioned beneath the objective. Image forming light returned through the microscope system passes through the beam splitters to form, at image planes of the microscope system, right and left eye stereoscopic images of the specimen. The images are viewed in the usual manner with right and left eyepieces of the microscope.

It is also contemplated that light polarizing means be incorporated in the aforesaid vertical illuminating system for affording maximum discreteness of right and left eye image forming light passing into and through the microscope optical system.

Description of the drawing

FIG. 1 illustrates, in perspective, one embodiment of the present invention;

FIG. 2 is, primarily, a vertical cross-sectional view of the aforesaid embodiment of the invention; and FIG. 3 is a view generally similar to FIG. 2 illustrating a modification of the invention.

DESCRIPTION OF THE PREFERRED EMBODIMENTS

In FIGS. 1 and 2 there is illustrated stereoscopic microscope 10 incorporating a preferred embodiment of the invention namely, vertical illuminator 12.

Microscope 10 is typical of one type of stereoscopic microscopes to which illuminator 12 is applicable. Details of the construction and operation of microscope 10 may be had by reference to U.S. Pat. No. 2,901,943 and, accordingly, these details will not be dealt with herein. It is pointed out, however, that, for ease of illustration, microscope 10 has been shown without the plurality of Galilean magnifying systems which are illustrated in Pat. No. 2,901,943.

The aforesaid Galilean systems having no bearing on the present invention may, nevertheless, be incorporated in miscroscope 10, if desired.

Structurally, microscope 10 differs from the microscope of Pat. No. 2,910,943 substantially only in that vertical illuminator 12 is interposed between the presently illustrated image forming doublets 14, 16 and objective 18. This, however, does not alter the function of the dual optical system of the microscope in producing stereoscopic images of specimens placed beneath its objective. Objective 18 is of the collimating type, focusing at infinity, wherein image forming light is collimated between it and doublets 14 and 16. Thus, the increase in path length resulting from the use of illuminator 12 does not adversely affect the focus of the microscope.

Referring more particularly to illuminator 12, it will be seen from FIGS. 1 and 2 that the device comprises housing 20 of hollow construction having an enlarged main cavity 22 and lateral extension 24 within which is housed light source 26. Light source 26 is, as it should be apparent from FIG. 2, simply an electric light bulb of the type commonly used in microscope and other instrument illuminating systems. It is disposed longitudinally within a ventilated hollow portion 28 of extension 24.

Extending right angularity from main cavity 22 in spaced superimposed relationship with each other are circular bores 30 and 32 defining discrete passageways from hollow 28 to cavity 22 through each of which a beam of light from source 26 is directed into cavity 22 by lens systems and in a manner to be described in detail hereinafter.

In cavity 22 and supported directly in line with bores 30 and 32 are beam splitters 34 and 36 respectively which, in the particular application of this invention, each face its respective bore 30 or 32 at an angle of 45° relative thereto. Beam splitters 34 and 36 may comprise half-silvered mirrors performing the well-known function of simultaneously reflecting and transmitting substantially equal parts of light directed thereonto at angles of and near 45°. These beam splitters are supported within cavity 22 by brackets 38 and 40 respectively which extend from wall 42 of the cavity and are fastened with screws 44 and 46 to wall 42.

Nipple 48 threaded into body 50 of microscope 10 is used to connect illuminator 12 to microscope 10. The proximal end of housing 20 is provided with bore 52, opening into cavity 22 into which the depending end 54 of nipple 48 may be intimately fitted. Housing 20 is slipped over end 54 of nipple 48 and releasably locked therein-place with set screw 56. Screw 56 engages in annular groove 57 which prevents slippage of the housing on end 54 in the event of slight accidental loosening of screw 56.

Directly below and coaxial with bore 52 in housing 20 is a threaded opening 58 into which microscope objective 18 is threaded. A clear passageway extends through nipple 48 for the dual branches, i.e. image forming paths, of the optical system of microscope 10. These image forming paths are diagrammatically represented by dot-dash lines 59 and 60.

It should be understood that means other than nipple 48 may be used to connect illuminator 12 to the microscope body particularly in instances wherein it may be desired to apply illuminator 12 to microscopes of different design than that herein illustrated. In the present instance, however, nipple 48 may be removed from the microscope body 50 and replaced with objective 18, or another similar objective, thereby rendering the microscope readily convertible for use with or without illuminator 12.

In the illustrated embodiment of this invention the spaced optical image forming paths of microscope 10 are parallel for the reason that, as already mentioned, objective 18 is of the collimating type. They also extend in directions perpendicular to the axes of bores 30 and 32. Beam splitters 34 and 36 being disposed at an angle of substantially 45° to their respectively adjacent bores 30 and 32 are centered one in each of optical paths 59 and 60. Thus, they are approximately 50 percent transmissive to image forming light directed along said paths.

Substantially equal amounts of light from source 26 are directed into and through bores 30 and 32 by a condenser lens system comprising, in the present instance, lenses 62, 64 and 66 (FIG. 2). By such means, beams of light from source 26 are directed along two discrete paths 68 and 70 (illustrated by dash lines) substantially right angularly of paths 59 and 60 onto beam splitters 34 and 36 respectively and thence, by reflection, along paths 59 and 60 through objective 18 onto a specimen surface placed in object plane 72 of microscope 10.

The interior walls of housing 20 are rendered light absorptive as, for example, with a coating of dull black paint or the like, whereby light from the illuminating system which is not reflected by beam splitters 34 and 36 is absorbed within cavity 22.

In FIG. 2, arrow heads trace the path of one beam of light through bore 32, onto beam splitter 36, down optical path 60 of the microscope, through objective 18 and onto object plane 72. A specularly reflecting surface of a specimen positioned in plane 72 will thus become truly vertically illuminated and reflect at least a substantial portion of the illumination back into objective 18 along optical path 59 to produce one of the stereoscopic images of the specimen surface. Light directed onto beam splitter 34 will, obviously, follow a reverse direction; i.e. down optical path 59 of the microscope, through objective 18 to the specimen surface in object plane 72 and back, by reflection from the specimen surface, along optical path 60 to produce the other stereoscopic image of the specimen surface.

It should be understood that while objective 18 is illustrated as being of the single unit type having a lens system common to both branches (paths 59 and 60) of the microscope, substitution of dual microscope objectives may be made. Also, illuminator 12 is adaptable to stereoscope microscopes of the type having converging optical systems such as are shown in Pat. No. 2,087,329, for example. The adaptation may require slight mechanical modification of the above-described means for connecting the illuminator to the microscope body and angular adjustment of beam splitters 34 and 36 to accommodate for convergence of the stereoscopic image forming systems. Nevertheless, all modifications and adaptations of the precise form here shown which may be made to suit particular requirements within the range of equivalency to which this invention is entitled in view of the prior art are intended to be covered.

A modification of the optical system of illuminator 12 is illustrated in FIG. 3 wherein light polarizers 74 and 76 are introduced into the system of illuminator 12'. Illuminator 12' is otherwise identical to illuminator 12 of FIGS. 1 and 2 and corresponding reference numerals are to be taken as designating like parts.

Polarizers 74 and 76 are supported by brackets 78 and 80 respectively in a manner similar to the supporting of beam splitters 34 and 36 with brackets 38 and 40.

Polarizers 74 and 76 are centered one in each of optical paths 59 and 60 of microscope 10 and are of the circularly polarizing type; i.e. of the type wherein each electric vector of a light beam passing therethrough is broken into two perpendicular components that have equal amplitudes and that differs in phase by one-quarter wavelength, or any odd integral number of quarter wavelengths.

One of polarizers 74 and 76 is a right hand circular polarizer and the other a left hand circular polarizer wherein beams of light reflected from beam splitters 34 and 36 and directed through respective polarizers 74 and 76 are circularly polarized along the respective paths 59 and 60 in opposite directions. After passing through objective 18 and being reflected from a specimen surface at object plane 72, as image forming light to be returned through the microscope image producing optical system, reversal of direction of rotation of polarization due to specular reflection takes place. Accordingly, light directed along one path 59 or 60 can only return, as reflected light, through the other path of the microscope system for image forming purposes. By so isolating image forming light in one path or branch 59 or 60 of the microscope system from that in the other branch, improved stereopsis results. That is, light intended to produce one of the stereoscopic images is prevented from partially intermixing with light intended to produce the other of the stereoscopic images whereby the pair of images are individually substantially pure with the result of enhancement of definition and color fidelity of the fused composite of the two images seen by the operator of the microscope.

Polarizers 74 and 76 are preferably tilted slightly from a perpendicular relationship with optical paths 59 and 60 to cause skew light rays produced by specular reflection from their surfaces to be directed against the light-absorbing inner sides of the illuminator housing and absorbed thereby for furthering pureness of right and left eye stereoscopic images.

Slot 82 in lateral extension 24 of illuminator 12 is adapted to receive color and neutral density filters conventionally used in the art of microscopy. One such filter is illustrated in FIG. 1 as slide 84. Those interested in this aspect of microscopy may refer to the aforementioned Pat. No. 2,471,879 for an explanation thereof.

We claim:

1. In a microscope, the combination of dual optical systems for forming a pair of spaced sterescopic images of an object placed in an object plane of said systems and vertical illuminating means for introducing light beams discretely into each of said systems so as to travel along the two different optical paths thereof toward said object plane for illuminating the object thereat; the illuminating means comprising:

a housing having a main body portion through which said optical paths are directed and a lateral extension, said housing being generally of hollow construction with a pair of spaced parallel passageways establishing communication proximally between said extension and said main body portion;

a single light source adjacent the distal end of said extension;

condenser lens means between said single light source and each of said passageways for receiving and directing a beam of light rays from said single source through each of said passageways in directions respectively transversely related to said optical paths and with substantially all of the light rays of one of said beams crossing one of said paths;

a pair of beam splitters in said main body portion of said housing with one disposed in each of said optical paths, said beam splitters being positioned so that one is relatively higher than the other in said optical systems and with each so located in its respective optical path as to discretely receive substantially all of the light rays of one of said beams of light and redirect a substantial portion thereof along its corresponding optical path toward said object plane for vertical illumination of said object.

2. The combination according to claim 1 further including objective lens means and means on said housing between said beam splitters and said object plane for detachably receiving said lens means.

3. The combination according to claim 2 wherein said objective lens means is a unit common to both of said image forming systems whereby said optical paths and light directed therealong extend through said unit.

4. The combination according to claim 1 further including a light polarizer centered in each of said optical paths between corresponding beam splitters in said paths and said object plane.

5. The combination according to claim 4 wherein said polarizers comprise means for circularly polarizing light, one being a right hand circular polarizer and the other being a left hand circular polarizer.

References Cited

UNITED STATES PATENTS

| 2,471,879 | 5/1949 | Lowber et al. | 350—236 |
| 2,901,943 | 9/1959 | Tackaberry | 350—36 |
| 3,007,371 | 11/1961 | Tallman | 350—15 |
| 3,143,032 | 8/1964 | Cednas | 350—213 |
| 3,191,493 | 6/1965 | Mainardi et al. | 350—157 X |
| 3,202,041 | 8/1965 | Bernhardt | 350—157 X |
| 3,297,391 | 1/1967 | Benford et al. | 350—236 |
| 3,405,990 | 10/1968 | Nothnagle et al. | 350—15 |

FOREIGN PATENTS 603,323   7/1932   Germany.

PAUL R. GILLIAM, Primary Examiner

U.S. Cl. X.R.

350—15, 36, 213